US011880348B1

(12) United States Patent
Roy et al.

(10) Patent No.: US 11,880,348 B1
(45) Date of Patent: Jan. 23, 2024

(54) DATABASE WITH IN-MEMORY DATA STORES

(71) Applicant: Amazon Technologies, Inc., Seattle, WA (US)

(72) Inventors: Gourav Roy, Seattle, WA (US); Qu Chen, Seattle, WA (US); Allen Robert Samuels, San Jose, CA (US); Kevin R McGehee, Shoreline, WA (US); Itay Maoz, Bellevue, WA (US); Abhishek Kumar, Ranchi (IN); Juan Carlos Gomez, San Jose, CA (US); Jan Raak, Shoreline, WA (US); Ahmed Hesham Salem, Everett, WA (US)

(73) Assignee: Amazon Technologies, Inc., Seattle, WA (US)

( * ) Notice: Subject to any disclaimer, the term of this patent is extended or adjusted under 35 U.S.C. 154(b) by 269 days.

(21) Appl. No.: 17/157,135

(22) Filed: Jan. 25, 2021

(51) Int. Cl.
*G06F 16/00* (2019.01)
*G06F 16/22* (2019.01)
*G06F 12/0893* (2016.01)
*G06F 11/10* (2006.01)
*G06F 16/27* (2019.01)
*G06F 16/18* (2019.01)
*G06F 21/64* (2013.01)

(52) U.S. Cl.
CPC ...... *G06F 16/2255* (2019.01); *G06F 11/1004* (2013.01); *G06F 12/0893* (2013.01); *G06F 16/1805* (2019.01); *G06F 16/273* (2019.01); *G06F 16/2237* (2019.01); *G06F 21/64* (2013.01); *G06F 2201/855* (2013.01); *G06F 2212/1016* (2013.01)

(58) Field of Classification Search
CPC ............ G06F 16/1805; G06F 16/2237; G06F 16/2255; G06F 16/273; G06F 11/1004; G06F 12/0893; G06F 21/64; G06F 2201/855; G06F 2212/1016
See application file for complete search history.

(56) References Cited

U.S. PATENT DOCUMENTS

| 10,936,412 | B1* | 3/2021 | Visvanathan ....... G06F 12/0866 |
| 11,455,305 | B1* | 9/2022 | Hwang ............. G06F 16/24549 |
| 2011/0099343 | A1* | 4/2011 | Ozdemir ............ G06F 11/2082 711/E12.001 |
| 2018/0089074 | A1* | 3/2018 | Li ....................... G06F 12/0238 |
| 2019/0278849 | A1* | 9/2019 | Chandramouli ........ G06F 9/526 |
| 2019/0392047 | A1* | 12/2019 | Sorenson, III ........ G06F 16/172 |

* cited by examiner

*Primary Examiner* — Diedra McQuitery
(74) *Attorney, Agent, or Firm* — Davis Wright Tremaine LLP

(57) ABSTRACT

A database management system maintains a collection of data using a log-based storage structure. In response to a request to store data items (key-value pairs), the database management system stores mapping information to a data item in an in-memory data structure while the data items are stored on the log-based storage structure. The hash of the key includes information to identify an index entry that comprises information that maps to the location of the data item stored on the log-based storage structure.

20 Claims, 12 Drawing Sheets

Item Format

DATABASE WITH IN-MEMORY DATA STORES

BACKGROUND

Databases are called upon to provide fast, reliable, and consistent access to data. To provide such access at scale, distributed databases have been developed. A distributed database may comprise numerous computing devices potentially distributed across various data centers and geographical locations, in order to provide efficient and scalable access to data. However, many client applications increasingly demand greater efficiency and reduced access times to data.

BRIEF DESCRIPTION OF THE DRAWINGS

Various techniques will be described with reference to the drawings, in which.

DETAILED DESCRIPTION

Figure 1:
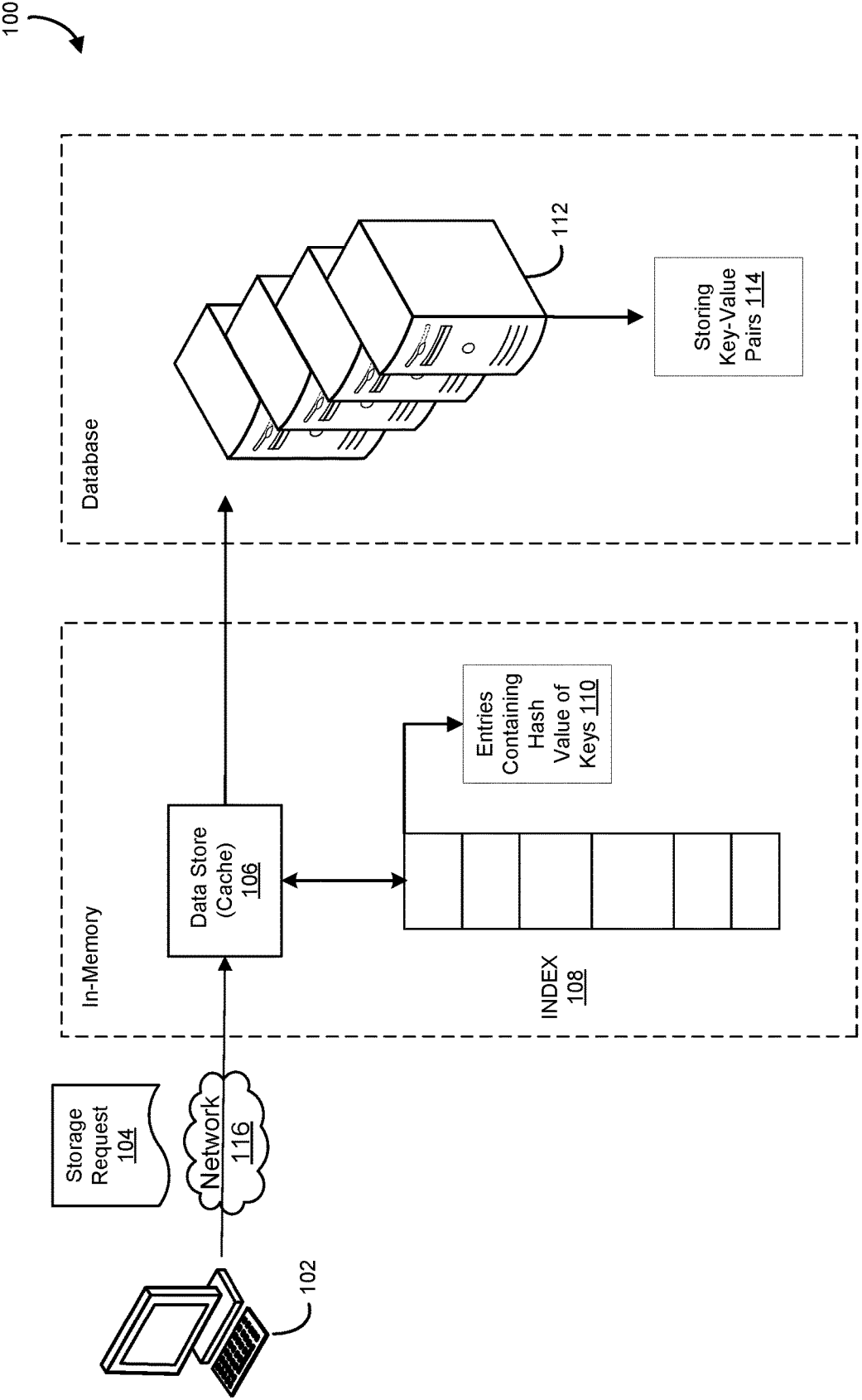
FIG. 1 illustrates an example of a database management system using an in-memory data store with index entries, that map to a location in a log-based storage structure, in accordance with at least one embodiment.

Described herein are systems and techniques related to the operation of databases, including in-memory data stores. In an embodiment, a database management system is used to create, read, update, and delete data from a database with multiple storage layers. In an embodiment, the database management system uses an in-memory data store (e.g., data that is stored and managed exclusively in main memory) to include a hash table that helps index into a layer of storage layers of the database (e.g., log-based storage structure, flash, disk, file store). In an embodiment, the hash table is stored in memory and a fixed size log is stored on the flash.

The database management system may receive a request, from a client computing device, to store a data item (represented by a key-value pair) to a database. The database management system may respond to the request by instructing a storage node to store the item. The key may be stored in-memory and the value associated with the data item may be stored in the storage node. The key may be used to identify the location of the stored data item. However, there are cases in which it would be advantageous to not store the entirety of the key in the in-memory data store and instead store bits containing information to map to the key to conserve space while using information from the hash to provide quick and efficient access to the data stored in databases. For example, in some cases, having large amounts of keys in an in-memory data store causes low throughput and/or slow response times and thus, storing information that is locatable by hash values of the keys would provide an improved customer experience by having lower latency and higher throughput.

When storage requests for data are received, the database management system may instead use the hash of the key (e.g., a hash value of the key) to construct an index entry in an index that is maintained in the in-memory data store while the data items (e.g., key and value) are stored in the database. The index entry may act as the pointer to the data item stored in the database. Each index entry may be in a hash table that contains an offset (e.g., location) in the log file associated with the database where the data item of each entry is stored. In an embodiment, a tail and head offset is maintained in memory to keep track of the extent of the log written.

In an embodiment, the in-memory data store uses a chained hash table. By using a chained hash table, collisions in the hash table may be avoided while also having a configuration that can be scaled. In an embodiment, each entry in the hash table comprises 16 bytes. In an embodiment, 8 of the 16 bytes are used to point to the next entry in the same bucket. In an embodiment, in the remaining 8 bytes, a portion of the bytes are used for storing the location of the data item and another portion of the remaining 8 bytes are used to assist the growth of the index and also help in conflict resolution when multiple keys are hashed to the same hash bucket.

That is, in an embodiment, when the location contains the reference to the data on flash, 47 bits are used to store the offset in the file. By using 47 bits, 140 terabyte (TB) of log file can be addressed. In an embodiment, two bits are used to determine whether 1, 2, 4, or more than 4 pages are needed to read the data. In an embodiment, 14 bits are used for hash. In these 14 bits, some of the bits may be utilized to allow the index (also referred to herein as an index table) to grow and to also provide conflict resolution. Moreover, in an embodiment, one bit is used to determine if the data is stored on flash or in memory buffer.

In an embodiment, when items are deleted from the store, the reference from the hash table is removed, which leaves a dead item in the log. In an embodiment, a cron job (e.g., a time-based job scheduler) for garbage collection runs when the available space in the log goes below a certain threshold. In an embodiment, the cron job scans the log from the tail and if it finds items that are alive, it moves them to the front of the log and moves the tail to the offset of the next item. In an embodiment, the cron job skips the items that are not alive. In an embodiment, the log is circular in nature. In an embodiment, when the head reaches the maximum offset of the log file, it is set back to 0. In an embodiment, when the database management system performs a cron job, this would append new data to the head of the log and remove old data from the tail of the log reducing the impact of garbage collection on the performance of the system. In an embodiment, in addition to garbage collection, the database management system also configures the data store to support online snapshotting and seeding using a snapshot. In an embodiment, the data store also supports expiration of items and the eviction of items when the data store is out of space.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including that embodiments disclosed herein enable storage node clients or third-party applications to improve processing of deleted records in a wide variety of scenarios, including but not limited to scenarios involving replication.

FIG. 1 illustrates an example of a database management system 100 using an in-memory data store 106 with index entries that map to a location in a log-based data storage structure 112, in accordance with at least one embodiment. In the example of FIG. 1, a database management system 100 maintains a distributed database 112 (or referred herein as a database, flash, drive, log-based storage structure, log-based store, file store, and/or disk) of data. In at least one embodiment, the database 112 comprises collections of data items, to which data may be added, updated, or deleted. In an embodiment, data is represented as a key-value pair. In some embodiments, data is represented as an attribute-value pair, name-value pair, and/or field-value pair. The key may be a unique identifier for the value (e.g., data). The collection of data may be stored among storage nodes associated with the database 112.

In the example database management system 100 of FIG. 1, a client computing device 102 (sometimes referred to herein simply as a client or user) submits a storage request 104. The storage request 104 may be initiated by a user with control of the client computing device 102. In some embodiments, the storage request 104 is initiated by the client computing device 102 based on preconfigured user or system polices. In an embodiment, the client computing device 102 is any appropriate electronic device operable to send and receive requests, messages, and or other such information over an appropriate network. That is, in an embodiment, a client computing device 102 (which is also described as an electronic client device 1202 in FIG. 12) may be a personal computer, a tablet computer, smart phone, a notebook computer, or the like. In addition, the client computing device 102 may also be a virtual machine or an instance of a virtual machine operating within a computing resource service provider. The client computing device 102 may send requests and messages over the network 116. As shown in FIG. 1, client computing device 102 is the sole device illustrated; however, there may be more than one client computing device implemented to send requests to store data.

In an embodiment, client computing device 102 sends a storage request 104 to store data (e.g., data item). The storage request 104 may be an application programming interface (API) request (sometimes referred to herein as an API call). The storage request 104 may be a PUT (e.g., putData) API request. In an embodiment, the PUT API request includes headers such as: content length (which specifies the data object's size in byes), authorization (which specific the authentication string for the storage request), content type, date and time of the request, a Message-Digest Algorithm (MD5) digest of the message, and/or host name. In an embodiment, the client 102 sends the storage request 104 over a wired or wireless network 116 of the database management system 100. The network 116 may be any appropriate network, such as the Internet, intranet, a cellular network, and/or any combination thereof. The network 116 may include one or more client computing devices, one or more servers, and/or clusters of servers interconnected with one another. In an embodiment, the client computing device 102 sends the storage request 104 over the network 116, such as the Internet, via a wired or wireless connection. In some embodiments, the transmission of storage request 104 does not go over network 116, but rather over locally communicating processes (e.g., inter process communication (IPC) calls). That is, the client computing device 102 may be co-located with the database management system 100 such that the storage request 104, for example, can be communicated over IPC techniques (e.g., UNIX-domain socket, loopback transmission control protocol (TCP) socket, shared memory, or subroutine call (API call).

In an embodiment, in response to receiving a storage request 104, the database management system 100 copies and adds the data item to a linked list of items that may be stored in an in-memory data store (e.g., in-memory data structure, cache) 106, such as a buffer, instead of directly writing to the database 112. That is, the data item may first be copied and added to a linked list of items. In an embodiment, once the total size of items in the linked list exceeds more than 4 Mebibytes (MiB), the items are then asynchronously written from the in-memory data store 108 to the database 112. In an embodiment, higher throughput is achieved when large blocks are written to the database 112. In an embodiment, the maximum space that is wasted during writing a block of size greater than or equal to 4 MiB is 4095 bytes. This may happen when the last page has only 1 byte written. Therefore, writing in 4 MiB block bounds the fragmentation to a maximum of one-percent (1%) of the log size. In an embodiment, an asynchronous write is an operation that is performed in a delayed fashion (e.g., the write request may be added to a queue of pending jobs) while other operations are processed before the write operation is completed. A response to the asynchronous write may be generated when the write request is added to the queue even though the write operation may or may not have been completed. The asynchronous write operation would be satisfied when the requests in the queue have been performed and the data item has been written to the database 112. In an embodiment, when the database management system 100 eventually performs a write of an item to the database 112, a header is attached to the item. The header may include at least at least one of: a checksum of the key, checksum of the value, or checksum of the header.

In an embodiment, the data items are kept in memory, until response of the write request is received from an asynchronous input/output (AIO) device. In the meantime, while the data items are kept in memory, an index (e.g., hash table) 108 has entries that point to the in memory location of the items. In an embodiment, the status of the write request is polled, at regular intervals, as a part of calling an API that runs cron jobs (e.g., RunCronTask API). In an embodiment, once a response of the write request is received, the index 108 is modified to point to the flash location (e.g., offset) of the items. That is, the index 108 may be maintained by an in-memory data structure that includes entries that map to a location of the items stored on the flash. At this point, the in-memory copy of the items may be freed and removed from the linked list of items. In an embodiment, the database management system 100 applies a hash function (e.g., hash algorithm) to a key to generate a hashed value of the key. Some examples of a hash algorithm include but are not limited to: Message-Digest Algorithm (MD) such as MD4 or MD5, and Security Hashing Algorithm (SHA) such SHA-1, SHA-2, SHA-256, or SHA-512. In some embodiments, an encryption algorithm is applied to a key instead of a hash algorithm such that cipher texts are stored instead of a hash value of a key. The hashed value of the key may generate an index entry where information can be stored in the index 108. In an embodiment, the hashed value of the key is also referred to as a hash code, digest, or simply a hash. In an embodiment, an entry in the index 108 points to the flash location (offset) of their respective value. The flash location may store the key-value pairs 114 representing the data item. A more detailed description with respect to the process of how data is stored using an in-memory data store 106 with database 112 is described below with respect to FIGS. 2-4 and 7.

Figure 5:
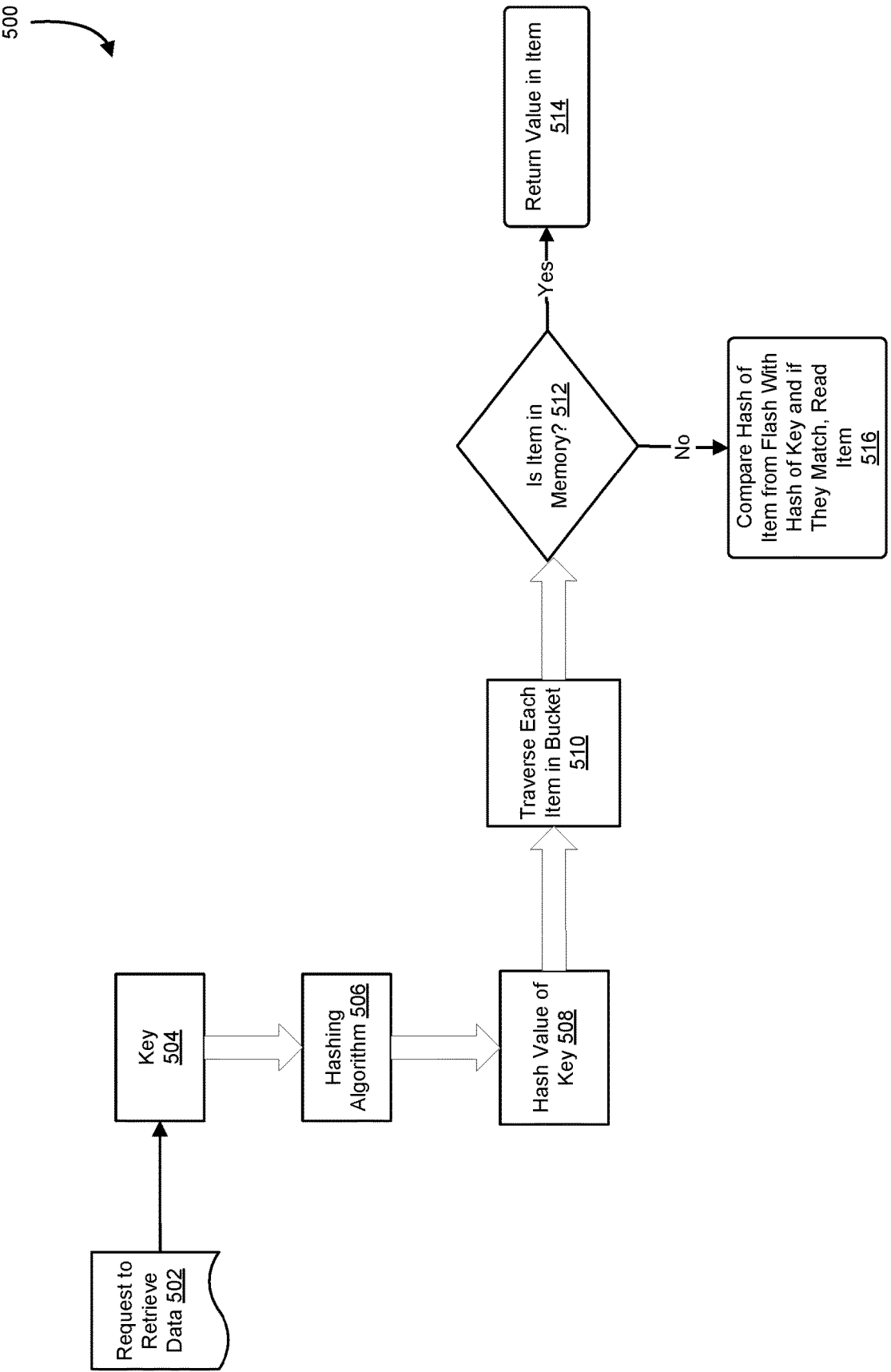
FIG. 5 illustrates an example process of providing client access to data using the in-memory data store or database, in accordance with at least one embodiment.

In at least one embodiment, after storing data in the manner described above with respect to FIG. 1, operations to retrieve data items from database 112 are described in more detail in FIG. 5. Moreover, operations such as preemptive garbage collection, online snapshotting and seeding using a snapshot are described in more detail with respect to FIG. 2. In an embodiment, the data store 106 also supports expiration of items and the eviction of items when the data store 106 is out of space.

Figure 2:
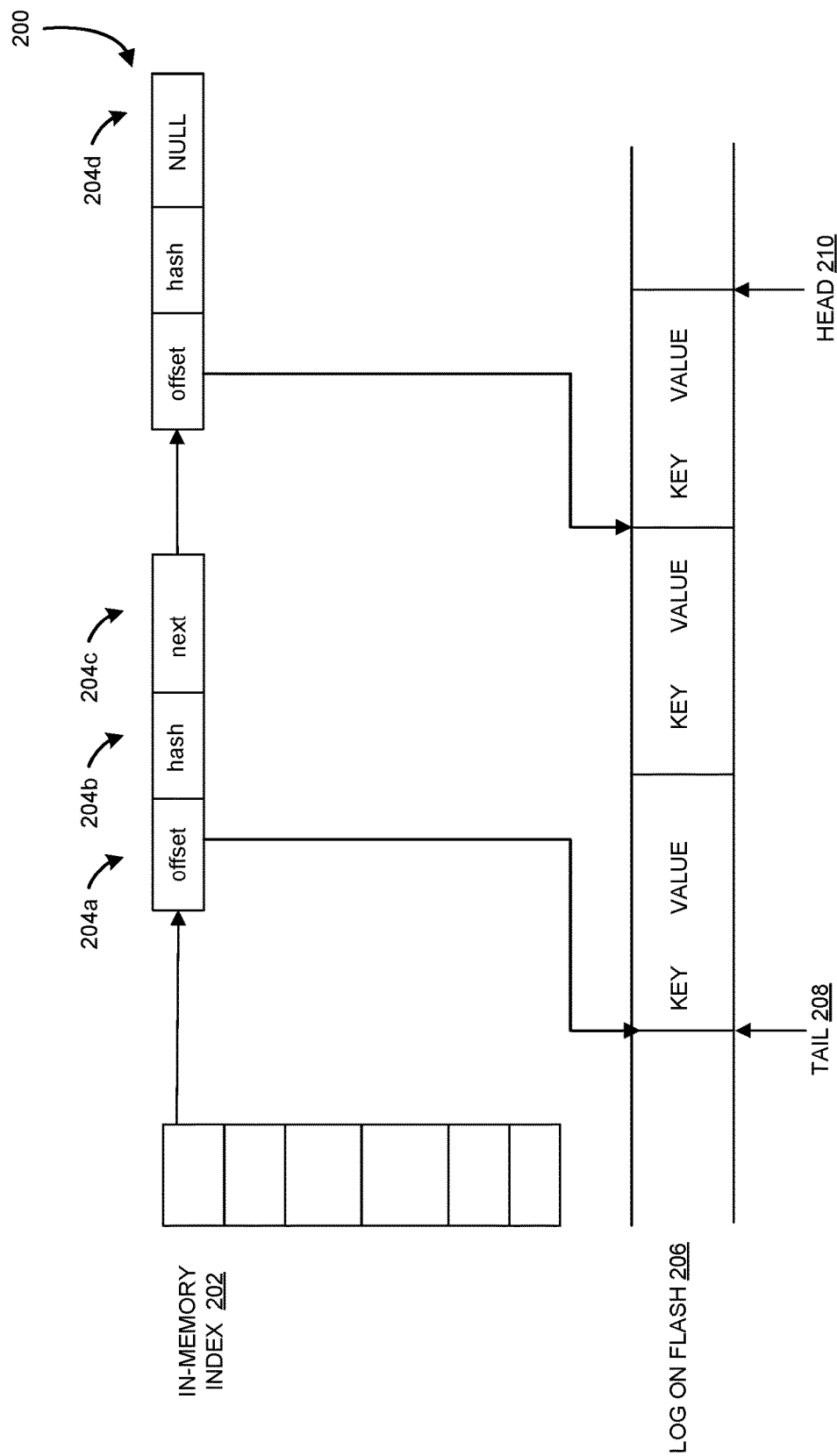
FIG. 2 illustrates an example of storing data in a log-based storage structure using an in-memory data store, in accordance with at least one embodiment.

FIG. 2 illustrates an example 200 of storing data in a log-based storage structure using an in-memory data store, in accordance with at least one embodiment. In an embodiment, when a database management system receives a storage request to store data, the data is first copied and added to a linked list of items in-memory instead of being directly written to flash 206. In an embodiment, the data is represented using a key-value pair. As noted above, there are various ways data may be represented and a key-value pair is just one example. In an embodiment, the database management system performs a hash on the key (associated with the data provided by the storage request) to generate a hash value of the key. The hash value comprises bits that identify the hash bucket in the in-memory index 202 that the key belongs to. In an embodiment, each new item entry is added to the hash chain in the identified hash bucket. In another embodiment, each new item entry is added to the end of the hash chain in the identified hash bucket. In an embodiment, each entry in the linked list of items comprises bits that are indicative of an offset 204a, hash value of the key 204b, and a pointer to the next item in the list 204c. In an embodiment, since the last item in the hash bucket does not have a subsequent entry after it, the last item in the hash bucket has a reference to null 204d. In an embodiment, the hash value of the key 204b also contains a few bits that are used for collision detection (which is described in more detail below with respect to FIG. 4). In an embodiment, the offset 204a is used as a pointer to indicate where the item (both the key and value) is written on flash 206. In an embodiment, the flash is a log-based storage structure where there exists a log on flash 206 that includes a tail 208 and a head 210. Each time an item is written to the log on flash 206, the database management system determines the position of the head 210 of the log on flash 206 and adds the item to that position. The position of the head 210 is then adjusted (e.g., moved forward) to be after the last item written to the log on flash 206.

As noted above, in an embodiment, the linked list has a threshold size of 4 MiB. In some embodiments, the linked list may have a smaller or larger threshold size than 4 MiB. In an embodiment, once the total size of items in linked list exceeds the threshold of 4 MiB, the items are asynchronously written to the flash 206. In an embodiment, when the item is written to the flash 206, a header is added to the item. In an embodiment, the header includes at least one of: the checksum of the key, checksum of the value, or checksum of the header. Once the response of write request is received by the database management system, the index entry for this key/value pair is updated to point to the flash location of the item stored. At this point, the in-memory copy of the items may be freed and removed from the linked list of items.

In an embodiment, when the amount of free space in the log on the flash 206 meets a certain threshold, the database management system performs garbage collection. In an embodiment, garbage collection includes identifying what flash space is no longer being used and to recycle this flash space for other uses. In an embodiment, the threshold (which may be dynamically determined) should be set such that the garbage collection is spread across a large interval of time (to avoid stalling the database management system). The threshold can be lower if the write rate is high and the threshold can be higher if the write rate is low. In an embodiment, garbage collection is run as part of the API function that runs cron jobs or cron tasks. During garbage collection, a 4 MiB block may be read (asynchronously) from the tail of the log. Accordingly, all the active items in this block may be copied to the head of the log and the tail of the log is moved forward by 4 MiB. In the event that there is a large item that does not fit in the 4 MiB block, the entire item may be read from the log and moved to the head of the log and the tail of the log may be moved forward accordingly.

As mentioned above, the database management system may perform garbage collection by executing a cron task API. Thus, garbage collection may be run when the amount of log free to be written goes below a certain threshold and, in response, the database management system reads (asynchronously) a block of 4 MiB size from the tail of the log. In an embodiment, the database management system then fetches the keys from the items in the block. For items having an index entry that references a key, the item may be copied and added to the buffer linked list. However, items having an index entry that does not reference a key may be skipped. If the last item in the block is incomplete, the tail may be moved to the offset of the last item. If the first item in the block is larger than 4 MiB, the rest of the item may be read from the log asynchronously. In an embodiment, any empty space due to fragmentation is skipped during garbage collection. Once the entire item is read, and if the item is present in the index, the item may be added to the buffer linked list and the tail is moved forward to skip this item. In an embodiment, an expiration determination is performed as part of garbage collection. For each active item found in the batch of items read from the tail of the log, each item may be checked whether it has expired or not. If the item has expired, the item may not be moved to the front of the log.

In an embodiment, the in-memory index (or simply index) 202 is configured to increase in size (e.g., up to a size that supports 2 Billion keys). In an embodiment, the size of the index 202 is always a multiple of two; however other multiples are also plausible. In an embodiment, each entry in the index 202 takes 16 bytes. In an embodiment, the data store is configured to start with a small index 202. The index 202 may grow larger when the load factor of the table 202 exceeds a certain threshold. In an embodiment, the hash value 204b stored in the entry of hash table may be configured in a way that allows the index 202 to grow. During the growing operation, the index 202 may double the size of existing table by using a realloc function. In an embodiment, existing buckets are referred to as old hash buckets and the hash buckets added after doubling the index is called new hash buckets.

In an embodiment, the database management system uses at least one hash bit of an entry to determine whether the entry would stay in the same hash bucket or would be moved to one of the new hash buckets (current hash bucket index+ size of old hash table). In an embodiment, if the bit is 0, then the entry stays in the same bucket. Otherwise, the entry may be moved to the new hash bucket. That is, in an embodiment, for each item in the hash bucket batch, if the ith significant bit in the hash is 1, the item is moved to the hash bucket at a different position (e.g., current position+size of old hash table). In an embodiment, i is the number of times the table has grown prior to this operation. In an embodiment, for the next growing operation, the next hash bit is used. In an embodiment, the index 202 is mutated during the growing operation. The keys, being inserted into the item during the growing operation, may be hashed into both old and new hash buckets. In an embodiment, if a GetData request is received by the database management system during the table growing operation, both the hash buckets are checked for the item. In an embodiment, if a PutData request is received by the database management system during the table growing operation, the hash would be placed either into the new or old hash buckets depending on the hash of the key.

In an embodiment, the database management system performs a snapshot that includes a point in time snapshot of the index 202 and the log on flash 206 (e.g., log file). In an embodiment, the head 210 and tail 208 of log 206, at the time when the snapshot is triggered, determine the extent of the log 206 for the snapshot. The log 206 between the tail 208 and head 210 offset can be read from a separate thread and written to a file or sent over to another computing device. The offset may be the snapshot pointer until the log 206 is transferred. The in-memory data store also is configured to respond to API requests to update the snapshot pointer in the in-memory data store. This API may be thread-safe as it updates an atomic variable. In an embodiment, while the snapshot is running, any information in log 206 beyond the snapshot pointer is not garbage collected. In an embodiment, the index 202 is snapshotted in an online fashion. In an embodiment, the database management system causes an iterator to go over each hash bucket and serialize the entries in the hash bucket. The index 202 may be snapshotted as part of the run cron task API. In each cron job, a batch of hash buckets may be selected and serialized. If a putData request comes for an item which belong to a hash bucket that has not been serialized, the hash bucket may be serialized before being mutated. In an embodiment, a radix tree is maintained that keeps track of all the hash buckets serialized ahead of its time in an effort to avoid re-serialization of the bucket. The table may continue to grow during snapshotting.

In an embodiment, the database management system performs the point in time snapshot of data by first storing the current tail (T) 218 and head (H) 210 of the log. In an embodiment, an additional snapshot pointer points to the current tail. In an embodiment, the garbage collector does not trim the log beyond the snapshot pointer. While the cron task is being performed on the database management system, a batch of hash buckets are iterated over. In an embodiment, for each entry in the hash bucket batch, the hash table entries are serialized and stored in memory. In an embodiment, the stored serialized hash table is incrementally flushed to a separate file. In an embodiment, when the database management system receives a PutData request, from a client computing device, during the snapshotting operation, a check is performed to determine if the request is going to mutate a hash bucket that has been serialized. In an embodiment, if the PutData request is for a bucket that has not been serialized, all the entries in the hash bucket are serialized and stored before the request is processed. In an embodiment, information about the out of time serialized buckets are stored in a separate radix tree. Once the entire hash table is serialized, the file containing the serialized hash table is handed over to the client computing device via an API directed to get the snapshot status (e.g., "UpdateSnapshotPointer API). In an embodiment, in parallel, a separate thread is used to read the log file from tail to either write it to a separate file or send it to another device. The separate thread reads the log in chunks and may cause the snapshot pointer to move forward once it has read the chunk (using the Update SnapshotPointer API). This way, in an embodiment, the snapshot operation does not block the garbage collection for too long of a time.

In an embodiment, the snapshot process is marked complete after the snapshot pointer is updated to the head 210 of the log 206 when the snapshot process started and the entire hash table 202 has been serialized. In an embodiment, growing the table 202 is not permitted when a snapshot is in progress. That is, in an embodiment, an ongoing growing the table operation is paused when snapshotting starts. However, in some instances, the table 202 continues to grow during snapshotting. In an embodiment, a bucket needs to be rehashed prior to serializing the entries in the bucket. The snapshotting of the index 202 would then be able slow down due to the additional rehashing performed on the bucket. During serializing the hash bucket that has not been rehashed, additional information may be added to the serialized items to indicate that the bucket has not been rehashed. In an embodiment, rehashing is performed on the replica when the bucket has not been serialized.

Figure 3:
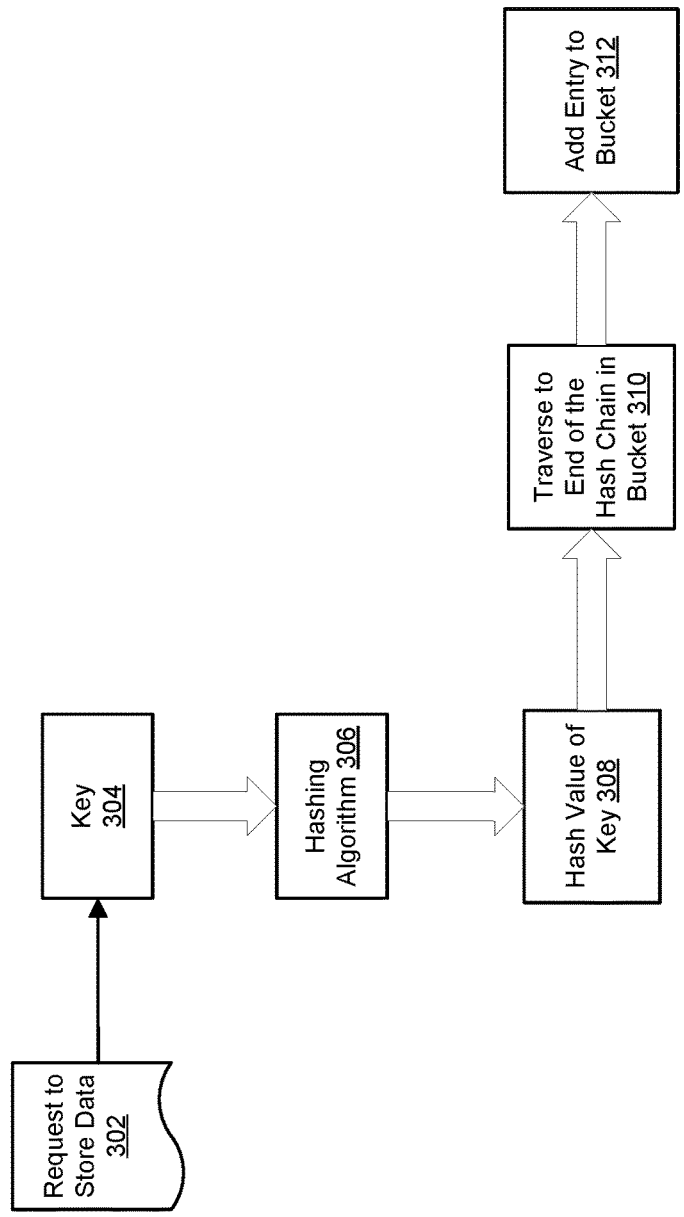
FIG. 3 illustrates a further example of storing data in a log-based storage structure using an in-memory data store, in accordance with at least one embodiment.

FIG. 3 illustrates a further example of storing data in a log-based storage structure using an in-memory data store, in accordance with at least one embodiment. In an embodiment, a database management system receives a request 302 to store data in flash (e.g., database). In an embodiment, the request to store data 302 is an API request submitted by a client computing device controlled by a user. In an embodiment, the request to store data 302 is a PUT API request (e.g., "PutData"). In response, the database management system may identify the key 304 associated with the data provided in the storage request 302. In an embodiment, the database management system applies a hashing algorithm 306 to the key 304. In an embodiment, after computing the hash value of the key 308, the hash value 308 is used to determine a hash bucket that the key belongs to. In an embodiment, entries in specific hash bucket in the index are individually traversed until it reaches the end of the hash bucket 310. After traversing to the end of the hash chain in the hash bucket, an index entry of the hash bucket 312 may be created. In an embodiment, the hash value is stored as an entry to the hash bucket 312 at the head of a list of entries associated with the hash bucket 312, to avoid having to first traverse to the end of the entries associated with the hash bucket 312.

In an embodiment, the database management system, in response to receiving a storage request, causes the item to be copied and added to a linked list of items in memory instead of writing it directly to flash. Once the total size of items in linked list exceeds a predetermined threshold (e.g., predetermined size), the items are then flushed to the flash and the items are removed from the linked list. When the item is in memory, the location in the hash table entry points to the memory address of the item. When the item is written to the flash, the location in the hash table entry is updated to point to the address of the item in the flash. In an embodiment, pointer tagging is used to differentiate between an in-memory location and on-flash location.

In an embodiment, if another entry in the flash contains the same value for key 304, the system allows for duplicate keys. This way, no additional operations are necessary for the system to determine if a PUT operation is creating a duplicate key. Additional operations that the system may save from having to be performed includes at least performing a GET API request and a DELETE API request on a key so as to avoid creating a duplicate. During a read operation, a response may just return one of the duplicated keys in the system depending on the insertion algorithm that's used. In an embodiment, any subsequent DELETE operations would only delete one version or may have to search to ensure that all duplicate versions are deleted.

Figure 4:
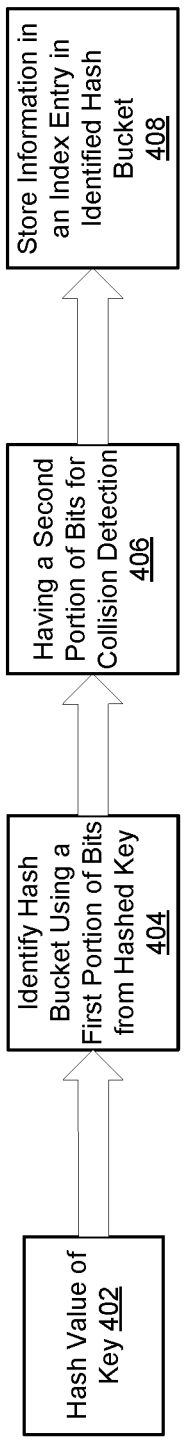
FIG. 4 illustrates a further example process of storing data in a log-based storage structure where hashed values of keys comprises bits for collision detection, in accordance with at least one embodiment.

FIG. 4 illustrates a further example process 400 of storing data in a log-based storage structure where hashed values of keys comprises bits for collision detection, in accordance with at least one embodiment. As described above with respect to FIG. 3, a database management system may receive a request to store data (e.g., PutData). The data may be represented as a key-value pair. In an embodiment, the database management system stores a copy of the data in an in-memory data store. When the size of the in-memory data store reaches a threshold, one or more blocks of data are written (asynchronously) to the database. In an embodiment, the database management system applies a hash algorithm to the key to generate a hash value of the key 402. The data (key and value) are stored in a log-based storage structure via an asynchronous process. The hash value of the key may be used to determine a hash bucket. After identifying the hash bucket, information about the key-value pair may be stored in an index entry in an in-memory data store. The hash value may be 64-bits in size. However, other sizes for the hash value are also plausible. In an embodiment, some of the bits are used to identify which hash bucket the hash value belongs to 404, and the remaining bits are used for collision detection (e.g., conflict resolution) 406. That is, in an example, some of the bits of the hashed key are used to help in conflict resolution when multiple keys are hashed to the same hash bucket. The additional bits in the hash value is configured such additional keys can be stored in the same hash bucket and thus, reduce collisions. Information about the location (offset) of the key-value pair in the log-based storage structure is stored as an index entry in the identified hash bucket 408.

As described in more detail with respect to the retrieval process in FIG. 5, as an example, a database management system receives a request to retrieve data (e.g., GetData). After the key is hashed, some of the bits are used to identify which hash bucket can be used to locate the key. In some instances, multiple keys may use the same hash bucket, and in order to find the correct key, some of the bits from the hashed key are compared with the bits in each of the hashed values stored in the identified hash bucket. If the bits match and the keys match after performing the hash bit comparison, then the value in the data may be retrieved from the in-memory data store and provided in response to the client retrieval request. If the keys do not match, then the next hash value in the identified hash bucket is traversed to determine whether it matches. These steps may be repeated until the key is found to match. If no match is found, then the data may be in the log-based storage structure. If the data is in the log-based storage structure, the hash of the data is compared with the hash of the provided key to determine whether it matches. If it matches, then an asynchronous retrieval request may be submitted to read the data from the log-based storage structure.

FIG. 5 illustrates an example process of providing client access to data using the in-memory data store or database, in accordance with at least one embodiment. That is, in an embodiment, a database management system receives a request 502 to retrieve data stored in flash (e.g., database). In an embodiment, the request to retrieve data 502 is an API request submitted by a client computing device controlled by a user. In an embodiment, the request to retrieve data 502 is a GET (e.g., "GetData") API request. In response, the database management system may search for the key 504 associated with the data requested. In an embodiment, a hashing algorithm 506 is applied to the key (provided by retrieval request 502). The hashing algorithm is the same hashing algorithm originally used to store the hash value of the key described above with respect to FIGS. 1-4. In an embodiment, after computing the hash value of the key 508, the hash value is used to look up the key in an in-memory index. The hash value of the key 508 includes information that identifies which hash bucket the key would belong in. In an embodiment, each entry of the identified hash bucket in the index is traversed 510. In an embodiment for each entry in the hash bucket, the database management system determines if the entry belongs to an item that is in-memory by comparing the key of the item with the key in the GetData request. If the key matches, the database management system may return the item in response to the GetData request and a GetData call returns back to the client computing device (e.g., the device that submitted the GetData request). If the key does not match, the next entry in the bucket may be checked. If the entry belongs to an item that is in flash (e.g., database), the hash of the entry may be compared to the hash of the key. If the hash does not match, the next entry may be checked. If the hash matches, an asynchronous request may be submitted to the flash to read the item. In an embodiment, one or more bits of the index entry are used to determine whether 1, 2, 4, or more than 4 pages are needed to read the item. In an embodiment, a response to the GetData request is provided back to the client computing device stating that the request is pending.

In an embodiment, the status of the pending read request is polled as part of the cron task or job mentioned above. The client computing device may seek to call this cron task API in regular intervals. Once the response for the read request is received, the checksum of the item may be validated. Subsequently, the key of the item read from flash may be compared with key in the GetData request. If the key matches, the item may be stored in a completed request list or returned as the result of the GetData request. If the key does not match, the next entry in the hash bucket may be checked.

Figure 6:
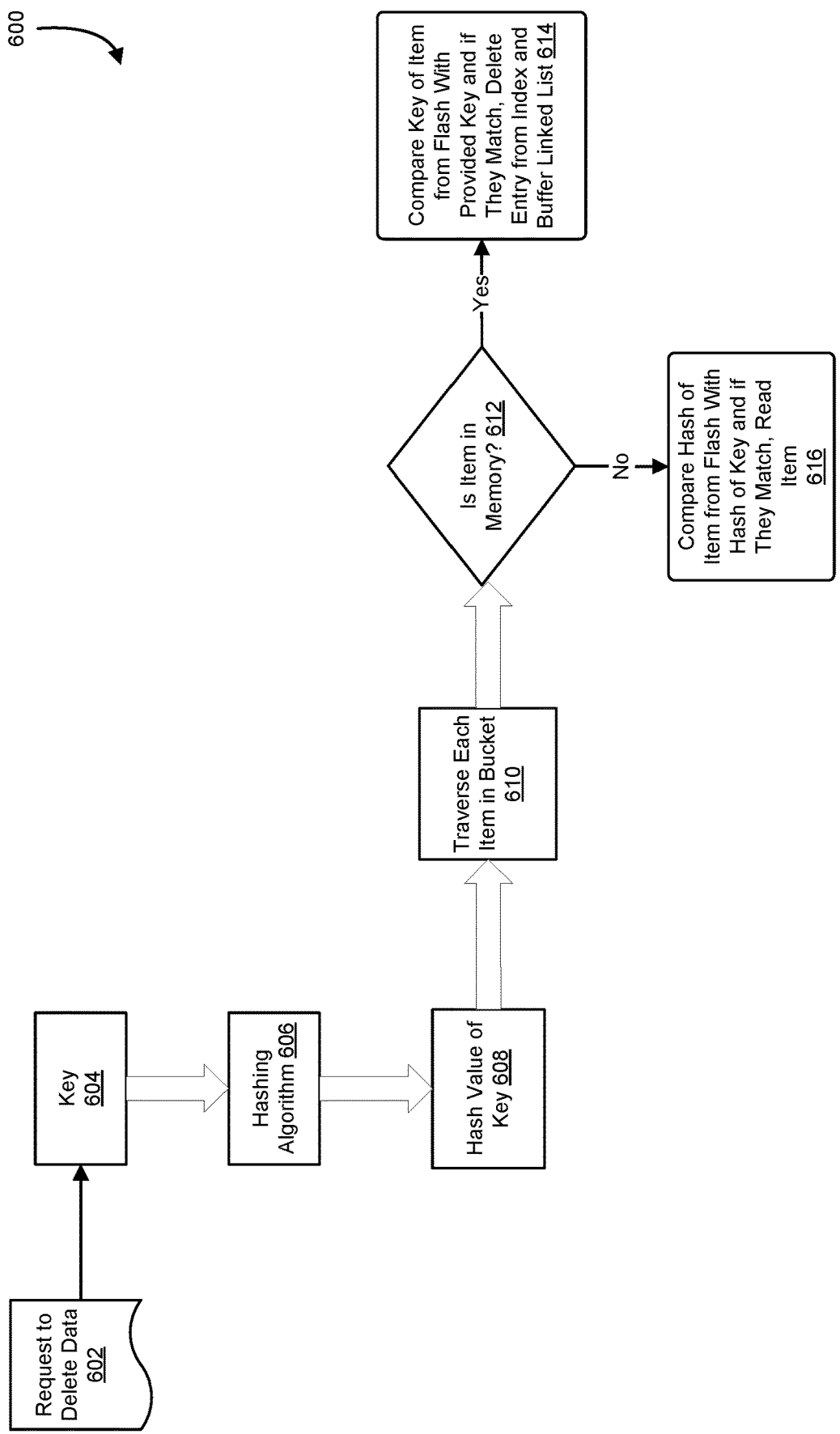
FIG. 6 illustrates an example of deleting data in an in-memory data store or database, in accordance with at least one embodiment.

FIG. 6 illustrates an example of deleting data in an in-memory data store or database, in accordance with at least one embodiment. In an embodiment, a database management system receives a request 602 from a client computing device to delete data. The data may be stored in-memory or in flash. In an embodiment, when a request to delete data (e.g., DeleteData API request) is submitted by a client computing device and received by a database management system, a key 604 (provided with the request 602) is looked up in index using its hash value. In an embodiment, the provided key 604 is hashed using a hashing algorithm 606. The hashing algorithm 606 may be the same hashing algorithm as the one used when the key was originally hashed and stored as described above. In an embodiment, once the hash value of the key 608 is determined, the database management system identifies from some of the bits in the hash value a hash bucket. In an embodiment, once the hash bucket is determined, the entries in the hash bucket are traversed 610. For each entry traversed in the hash bucket, the database management system may then determine if the entry that belongs to an item that is in memory 612. The key of the in-memory item is compared to the key provided in the request. If the key matches, the item may be deleted from memory by removing the in-memory entry from the index and buffer linked list 614. A response to the client computing device may be provided to indicate that the data has been deleted from memory. However, if the key does not match, the next entry is checked. If the entry belongs to an item that is in flash, the hash of the entry may be compared to the hash of the key. If the hash does not match, the next entry is checked. If the hash matches, an asynchronous request is submitted to read the item 616. A response to the client computing device may be provided to indicate that the asynchronous request to read the data item is pending.

In an embodiment, the status of the asynchronous read request is polled as part of cron task API. Again, the client computing device may seek to call this API at regular intervals. Once the response for the read request is received, the key of the item on flash is compared with key in the request to delete data 602. If the key matches, the entry may be deleted from the hash table and the information is stored in a completed delete request list. If the key does not match, the next entry in the hash bucket may be checked until found. In an embodiment, an API is used by the client computing device to fetch information about all the completed delete requests.

Figure 7:
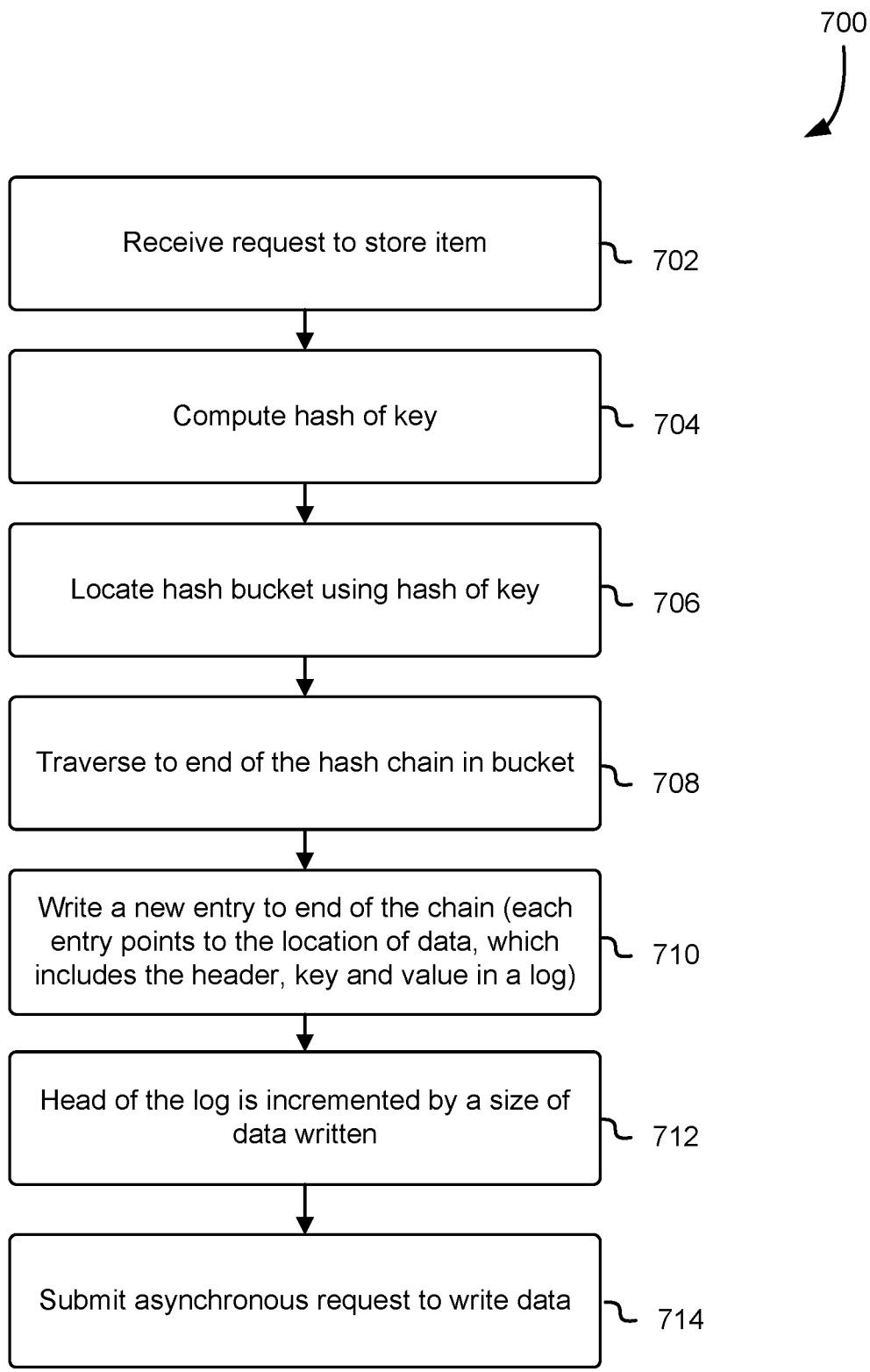
FIG. 7 illustrates an example process for operating a database management system to store hashed values of keys using an in-memory data store and a log-based storage structure, in accordance with at least one embodiment.

FIG. 7 illustrates an example process for operating a database management system to store hashed values of keys using an in-memory data store and a log-based storage structure, in accordance with at least one embodiment. In an embodiment, a client computing device submits a request to store data (e.g., PUTData). The database management system may receive this request 702 to store data. In an embodiment, the data item is represented as a key-value pair. The database management system applies a hashing algorithm to the key and the hash value is computed 704. In an embodiment, the database management system uses a portion of bits in the hash value to determine a hash bucket 706.

In an embodiment, after locating the hash bucket, the database management system traverses through to the end of the hash chain in the hash bucket 708 and writes a new entry to the end of the chain 710. In an embodiment, the new entry points to the location of data (stored on flash). Once the response of write request is received, the index points to the flash location (offset) of the item. In an embodiment, the new entry also includes a header and key and value in the log.

In an embodiment, the location of this data would be at the head of the log. In an embodiment, the head of the log is incremented by a size of the data written 712. In an embodiment, the database management system submits an asynchronous request to write data to the flash 714. In an embodiment, once the total size of items in linked list exceeds more than 4 MiB, the items are asynchronously written to the flash. In an embodiment, the total size of the items in the linked list is different from 4 MiB as it could more than 4 MiB or less than 4 MiB. In an embodiment, this threshold is predetermined by a user or by system polices. In an embodiment, when an item is written as an entry on the flash, a header is added to the entry. The header may include at least one of: a checksum of the key, checksum of the value, or checksum of the header.

Figure 8:
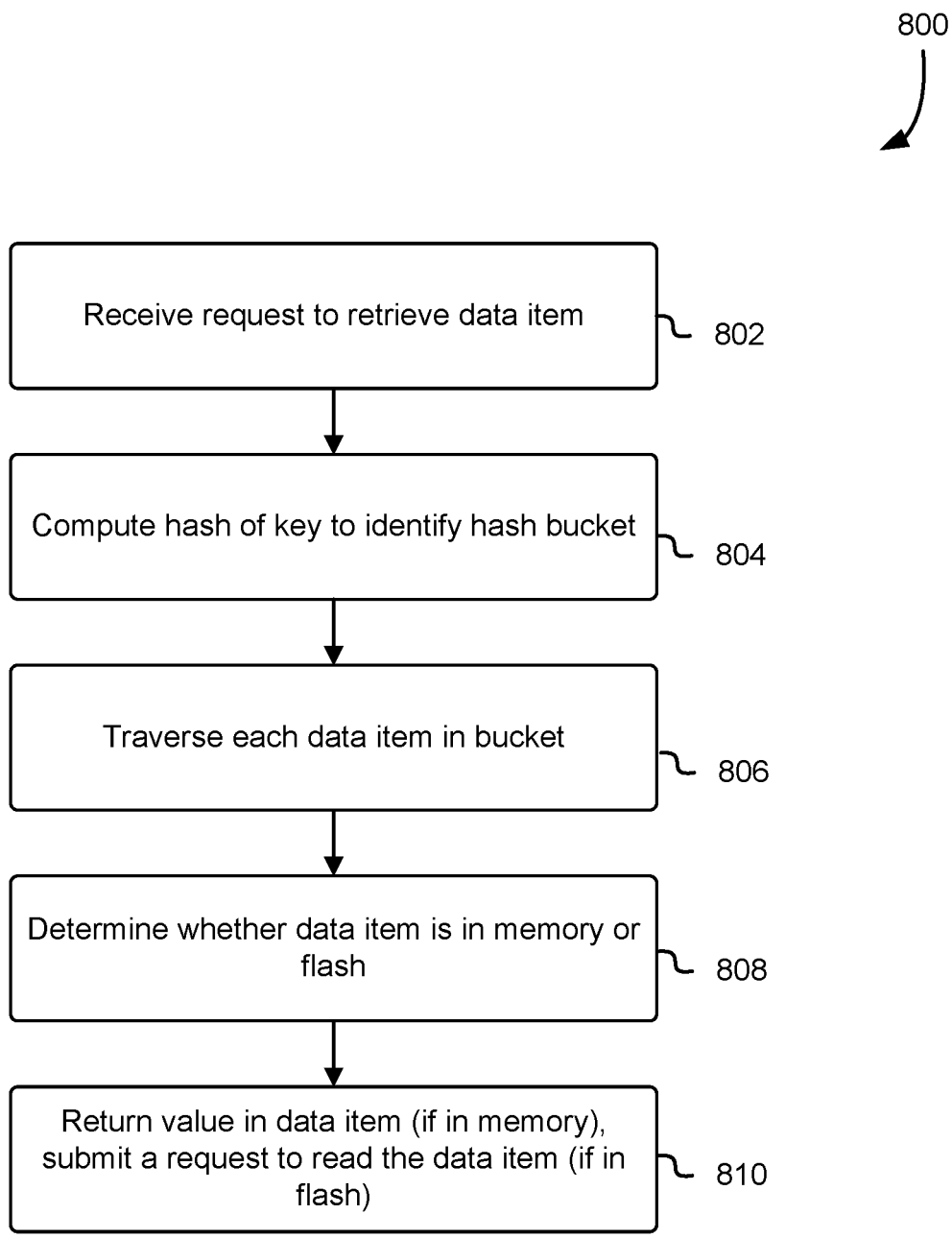
FIG. 8 illustrates an example process for operating a database management system to retrieve data using the hashed values of keys from an in-memory data store or a log-based storage structure, in accordance with at least one embodiment.

FIG. 8 illustrates an example process 800 for operating a database management system to retrieve data using the hashed values of keys from an in-memory data store or a log-based storage structure, in accordance with at least one embodiment. In an embodiment, a database management system receives a request to retrieve data (e.g., GetData) 802 from flash (e.g., from a storage layer in a database). In an embodiment, the request is an API request (or API call) submitted by a client computing device. In an embodiment, the database management system computes a hash of the provided key from the request 804. In an embodiment, the hash algorithm is the same hash algorithm used when storing the hash value of the key described above with respect to FIGS. 1-4 and 7. In an embodiment, the hash value results in a value that comprises 8-bits, 32-bits, 64-bits, or 256-bits. By using the hash of the key, some of the values in the bits are used to identify a hash bucket in an in-memory index 804. In an embodiment, after locating the hash bucket, a first traversal is performed where each entry in the bucket is traversed. If an entry belongs to an item that is in memory, the key of the item is compared with the key in the GetData request to determine whether they match. In an embodiment, the database management system determines whether the data item is in-memory by comparing the key in the item with provided key from the request 808. If there is a match, the value in this data item may be returned 810. However, if there is no match from comparing whether the key of the item matches the key from the GetData request then a second traversal is performed. The second traversal may be performed by identifying hash matches as potential candidates for full matches. In the case of zero hash matches, then the requested key is not present and the traversal may terminate at that point. In the case of at least one hash match 810, the values are read from flash in order to perform a full key comparison. In an embodiment, reading the hash-matches may be performed one at a time or potentially reading some or all of them speculatively (and in parallel) to search for matches.

In an embodiment, the database management system runs the cron task API that polls some or all the processed events at regular intervals. When the task receives the event for the read request, the key in the item may be compared with the provided key. If there is a match, the value in this data item may be returned. In an embodiment, there are multiple asynchronous tasks that are being executed in response to the API request. Some examples include but are not limited to garbage collection and growing the index. If the key does not match, the database management system may, in an embodiment, traverse to the next item in the hash bucket and repeats the steps until it is found. In some instances, this may be done in parallel. During submission of the request, the reference to the next item in the hash bucket and provided key is stored in the requested data. This information is returned with the response event corresponding to the request. This way, the next item may be retrieved and provided key while processing the response event. During handling of a response event, the checksum of the data retrieved is verified. When data needs to be fetched from flash asynchronously, GetData API may return a "pending" status back to the client computing device. In an embodiment, there is a separate API to fetch the data when it is retrieved from flash. The client computing device is expected to call it at regular intervals to get the completed GET requests. The GetData API also takes an additional flag to indicate whether to delete the item that is being read. If that flag is set, the entry corresponding to the item may be deleted from the index.

Figure 9:
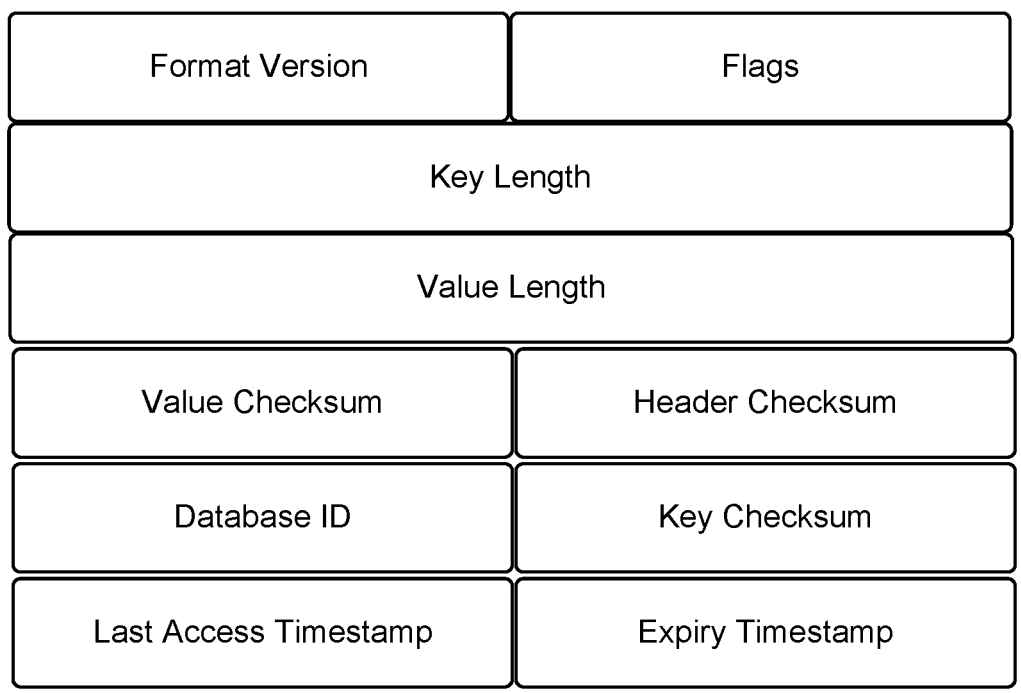
FIG. 9 illustrates an example header format, in accordance with at least one embodiment.

FIG. 9 illustrates an example header format 900, in accordance with at least one embodiment. In an embodiment, the header format 900 is formatted in a way that includes (but is not limited to) one or more fields such as: item format version, flags, key length, value length, database identifier, key checksum, value checksum, header checksum, last access timestamp, and/or expiry timestamp. As described below with respect to FIG. 10, the header format 900 may include the one or more fields where each of these fields vary in size (e.g., vary in byte size). In an embodiment, the format version helps update the key structure in a newer version of an in-memory data structure store. During an in-memory data structure store version update, the newer version of the in-memory data structure store may be started on a new instance and is synced with the old master. During syncing, the new in-memory data structure store will get the storage engine checkpoint containing the older version keys. The format version helps the newer in-memory data structure store understand and use the older keys. The new keys that are written would have the new format. In an embodiment, the flags value consists of 2 bytes which is indicative to determine the presence of optional fields (e.g., expiry time). In an embodiment, the header includes at least 4 bytes to indicate which database the header belongs. In other words, these 4 byes is indicative of the database ID for the header. In an embodiment, the header includes a number of bytes for CRC32, which is used to as a checksum of all the fields. In an embodiment, the last access timestamp indicates a date/time when the header was last accessed. In an embodiment, the expiry timestamp indicates a date/time when the key/value pair will expire. In an embodiment, a maximum key size, a value size, and/or a combination of key and value size is predetermined.

Figure 10:
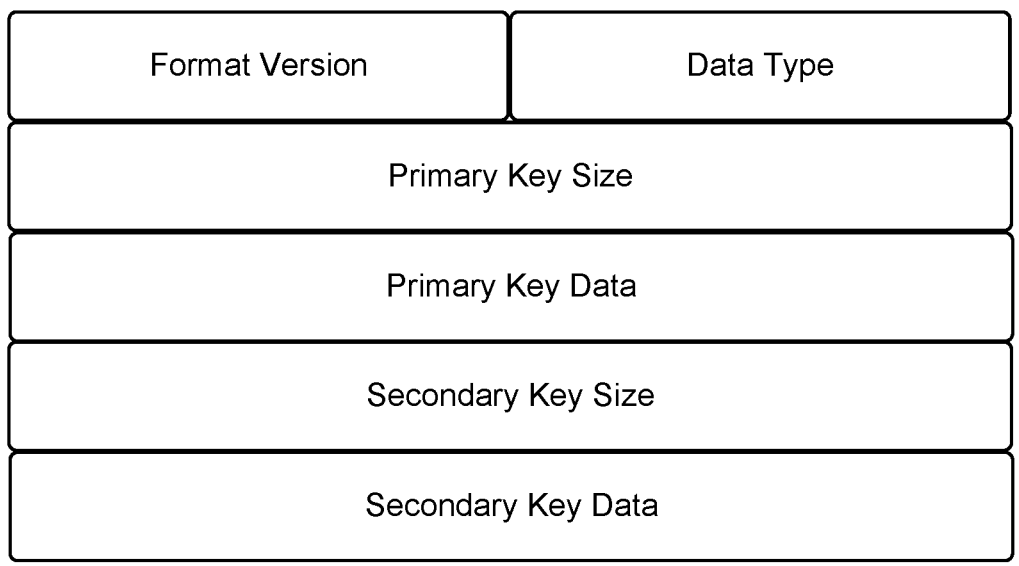
FIG. 10 illustrates an example key format, in accordance with at least one embodiment.

FIG. 10 illustrates an example key format 1000, in accordance with at least one embodiment. In an embodiment, a storage layer in a database is designed to be extensible to support storing different complex data structures such as hash maps and/or sorted sets. In an example, when implementing a hash map on top of a storage engine, the metadata about the data structure (e.g., number of items in the hash map) is stored in memory. Each entry in the hash map may be stored as a separate entry in the storage engine. The key for each entry in the storage engine may be constructed using a binary sequence as a key for the data structure as primary key and the key inside the data structure (field) as secondary key. The metadata entry may help support a command that is used to get the number of fields contained in the hash map at the key without performing a scan. An unsorted set may use the same implementation of the hash map. However, the one difference may be is that the value in each entry in the storage engine is empty for an unsorted set.

In an embodiment, the key format (e.g., complex key format or simple key) 1000 is formatted in a way that includes (but not limited to) one or more fields such as: format version, data type, primary key size, primary key data, secondary key size, and secondary key data. However, keys with different fields that are sorted in different orders may also be applicable as the key format 1000 in FIG. 10 is just one example.

In an embodiment, the key includes a number of bytes that provide information on a version of the key format. In an embodiment, the database management system is able to determine whether keys are new or old the version based on the key format 1000. In some instances, new keys that are written would have a new format. In an embodiment, the key 1000 also includes a number of byes of information to indicate data type.

In an embodiment, the key includes a number of bytes of information directed to the length of the primary key. In an embodiment, the key format 1000 supports a primary key size of up to 16 MiB. The size of 16MiB may just be one example of a maximum key size. In an embodiment, the key 1000 also includes some bytes used to contain the primary key data. The length of bytes used to contain this information may vary. In an embodiment, the key includes a number of bytes directed to the length of the secondary key. In an embodiment, the secondary key is optional and is used only for modelling complex data structures on top of storage. In an embodiment, the key contains the secondary key data. The length of bytes for the secondary key may also vary.

Figure 11:
FIG. 11 illustrates an example data item format, in accordance with at least one embodiment.

FIG. 11 illustrates an example of a data item format, in accordance with at least one embodiment. In an embodiment, the structure of a data item is formatted with a header, key, and value. The header of the data item may contain the lengths of the key and value. In an embodiment, the header also contains additional flags and checksums. In an embodiment, the header structure contains: a version of the header (4 bytes in size), a flag indicating if the data item is the last item before a page boundary (4 bytes in size), a length of key (8 bytes in size), a length of value (8 bytes in size), a database identifier for the data item (4 bytes in size), a key field checksum (4 bytes in size), a value field checksum (4 bytes in size), and/or a checksum of all the entries in the header except the header checksum (4 bytes in size).

Figure 12:
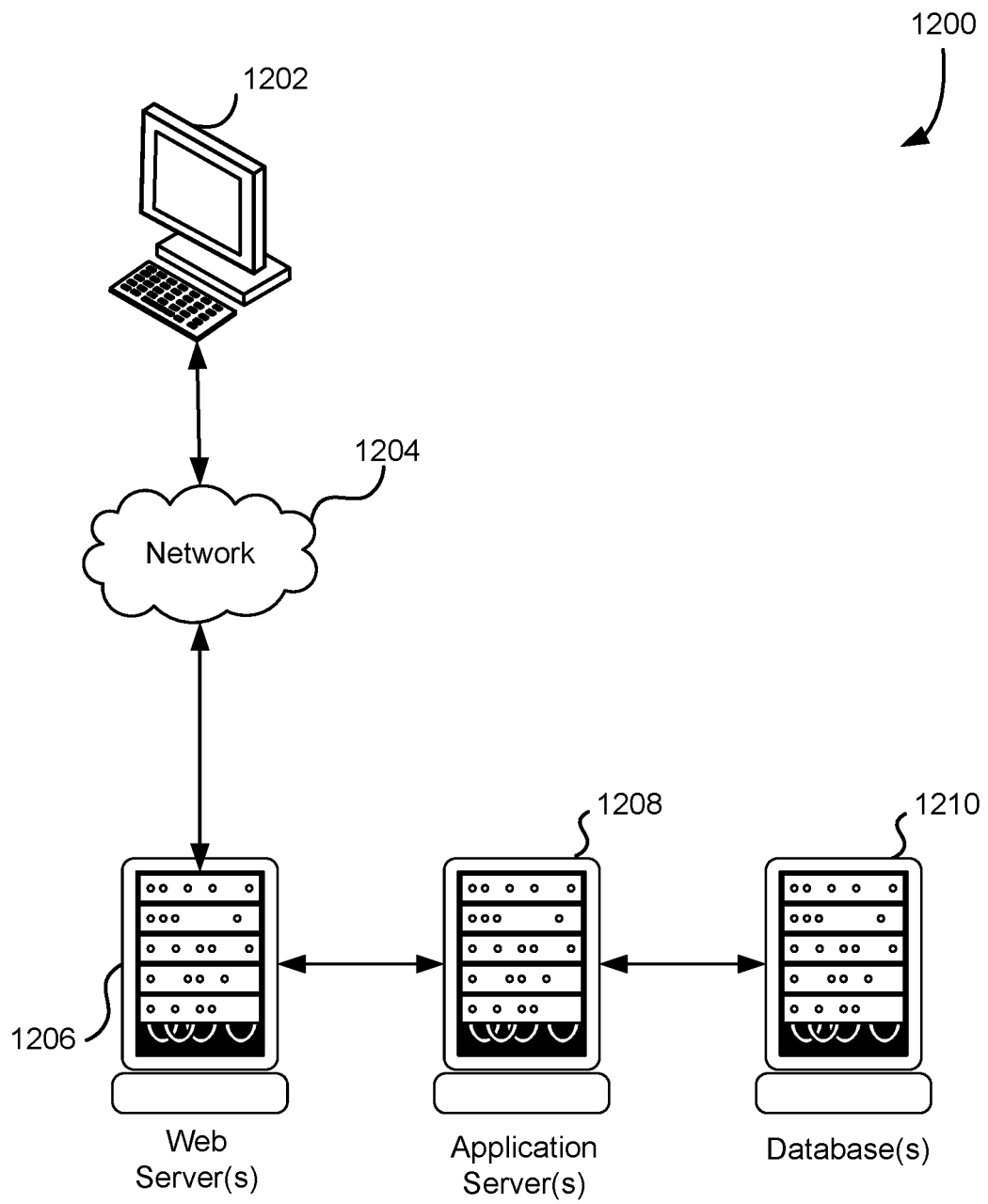
FIG. 12 illustrates a system in which various embodiments can be implemented.

FIG. 12 illustrates aspects of an example system 1200 for implementing aspects in accordance with an embodiment. As will be appreciated, although a web-based system is used for purposes of explanation, different systems may be used, as appropriate, to implement various embodiments. In an embodiment, the system includes an electronic client device 1202, which includes any appropriate device operable to send and/or receive requests, messages, or information over an appropriate network 1204 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1206 for receiving requests and serving content in response thereto, although for other networks an alternative device serving a similar purpose could be used as would be apparent to one of ordinary skill in the art.

In an embodiment, the illustrative system includes at least one application server 1208 and one or more database(s) 1210, and it should be understood that there can be several application servers, layers or other elements, processes or components, which may be chained or otherwise configured, which can interact to perform tasks such as obtaining data from an appropriate database. The application server(s) 1208 and database(s) 1210 may be operative on one or more servers. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with file-system, block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1202 and the application server 1208, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The database(s) 1210, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data and user information, which are used to serve content for the production side. The data store also is shown to include a mechanism for storing log data, which is used, in an embodiment, for reporting, computing resource management, analysis or other such purposes. In an embodiment, other aspects such as page image information and access rights information (e.g., access control policies or other encodings of permissions) are stored in the database using any of the above listed mechanisms as appropriate or in addition to mechanisms in a data store of the database 1210.

The database(s) 1210, in an embodiment, is operable, through logic associated therewith, to receive instructions from the application server 1208 and obtain, update or otherwise process data in response thereto, and the application server 1208 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1202. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1200 and/or another system, such as for launching, terminating, deleting, modifying, reading, and/or otherwise accessing such computing resources.

The database(s) 1210, in an embodiment, is associated with a database management system. The database management system may receive a request from a client computing device to store data. The system may apply a hash algorithm on a key to generate a hash value of the key to identify a hash bucket for an index entry to point to the location of the key-value pair stored in database(s) 1210.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1200, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems, and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C # or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
   at least one processor; and
   a memory comprising instructions that, in response to execution by the at least one processor, cause the system to at least:
      receive a request to store a data item, wherein the data item is represented as a key-value pair, wherein the key-value pair includes a key and a value;
      apply a hash function to compute a hash of the key;
      construct, using the hash of the key, an index entry of an index, wherein the index entry is maintained in an in-memory data structure; and
      submit, in response to a buffer associated with the in-memory data structure having items exceeding a predetermined size, an asynchronous request to write the data item to an entry in a log-based storage structure, wherein the index entry, maintained in the in-memory data structure, maps to the entry in the log-based storage structure.

2. The system of claim 1, the memory comprising further instructions that, in response to execution by the at least one processor, cause the system to at least:
   compute a checksum of the key-value pair to generate a key checksum and a value checksum; and
   attach a header to the entry in the log-based storage structure, wherein the header includes an item format version, the key checksum, and the value checksum.

3. The system of claim 1, wherein the log-based storage structure comprises a log with a head and a tail, and wherein the data item is written to the head of the log.

4. The system of claim 1, wherein the index entry includes at least a first portion of bits that is indicative of a location of the data item in the log-based storage structure, a second portion of bits indicating an amount of pages needed to read the data item from the log-based storage structure, and a third portion of bits that is indicative of a next entry in a hash bucket of the index.

5. The system of claim 1, wherein the index is a chained hash table.

6. A computer-implemented method, comprising:
   responding to a request to store a data item by at least:
      generating a hash value of a key of the data item;
      using the hash value to create an index entry of an index, wherein the index is maintained in an in-memory data structure; and
      causing, in response to a buffer associated with the in-memory data structure having items exceeding a predetermined size, the index entry to map to a location of the data item stored in a log-based storage structure.

7. The method of claim 6, further comprising:
   storing the data item in the in-memory data structure after receiving the request;
   causing the index entry to map to a location of the data item in the in-memory data structure;
   determining whether a size of items stored in the in-memory data structure meets or exceeds a predetermined number, wherein items stored in the in-memory data structure includes the data item; and
   submitting an asynchronous request, based at least in part on the determination, to store the data item to the log-based storage structure.

8. The method of claim 7, further comprising:
   receiving a response to the asynchronous request; and
   updating, based at least in part on the response, the index entry to map to the location of the data item stored in the log-based storage structure.

9. The method of claim 6, further comprising:
   adding a header to the data item when storing the data item to a head of a log file associated with log-based storage structure, wherein the header comprises an item format version, a key checksum, and a value checksum; and
   incrementing the head of the log file by a size of the data item being written.

10. The method of claim 6, further comprising:
    receiving a request to delete data;
    generating a hash value of a key provided in the request;
    traversing entries in a hash bucket of the index to determine whether the hash value of the key matches a hash value in the hash bucket; and
    deleting the index entry based at least in part on the determination.

11. The method of claim 6, further comprising:
    receiving a request to delete data;
    generating a hash value of a key provided in the request;
    traversing entries in a hash bucket of the index to determine whether the hash value of the key matches a hash value in the hash bucket;
    as a result of a determination that one of the entries in the hash bucket match the hash value of the key, submitting an asynchronous request to read a key from the log-based storage structure using hash value in the hash bucket;
    comparing the key provided in the request with the key in the log-based storage structure; and
    deleting the index entry based at least in part on the comparison.

12. The method of claim 6, wherein the index entry comprises a first set of bits that are directed to a location of the data item in the log-based storage structure or in-memory data structure, a second set of bits indicating an amount of pages needed to read the data item, and a third set of bits directed to a next entry in a hash bucket of the index.

13. The method of claim 6, further comprising increasing an amount of hash buckets in the index by:
- determining whether a size of index has exceeded a predetermined threshold;
- increasing, based on the determination, the size of the index; and
- traversing entries in a hash bucket of the index to determine whether to relocate an item in the hash bucket to a different hash bucket, wherein the determination is based at least in part on a value of a hash bit stored in an index entry.

14. A non-transitory computer-readable storage medium storing thereon executable instructions that, as a result of being executed by one or more processors of a computer system, cause the computer system to at least:
- receive a request to store a data item;
- compute a hash value by hashing a key of the data item;
- use the hash value to generate an index entry in an index maintained in an in-memory data structure;
- store, in response to the request and in response to a buffer associated with the in-memory data structure having items exceeding a predetermined size, the data item to an entry in a log-based storage structure; and
- use the hash value in the index, maintained in the in-memory data structure, to map to the entry of the data item in the log-based storage structure.

15. The non-transitory computer-readable storage medium of claim 14, wherein the executable instructions, as a result of being executed by the one or more processors, further cause the computer system to at least:
- receive a request to generate a snapshot of the index and data in the log-based storage structure;
- use an iterator to traverse one or more hash buckets of the index to serialize one or more entries associated with the one or more hash buckets;
- store the serialized one or more entries the in-memory data structure and flush the serialized one or more entries to a file; and
- provide the file in response to the request based at least in part on serializing all of the one or more entries.

16. The non-transitory computer-readable storage medium of claim 14 wherein the executable instructions, as a result of being executed by the one or more processors, further cause the computer system to at least:
- perform an asynchronous write to store the data item to the entry in the log-based storage structure as a result of a size of items in the in-memory data structure meeting or exceeding a threshold number, wherein the data item is written to a head of a log file of the log-based storage structure; and
- cause the head of the log file to be incremented by a size of the data item written.

17. The non-transitory computer-readable storage medium of claim 14, wherein the data item, stored in the log-based storage structure, includes a header comprising at least: a checksum of the key, a checksum of a value, a checksum of the header, and location of the data item.

18. The non-transitory computer-readable storage medium of claim 14, wherein the executable instructions, as a result of being executed by the one or more processors, further cause the computer system to at least:
- execute a task to remove blocks in the log-based storage structure, wherein the task at least:
  - reads a block from a tail of a log file of the log-based storage structure;
  - fetches a key associated with a data item in the block;
  - determines whether the key is present in the index;
  - adds the data item to a buffer linked list; and
  - causes the tail of the log file to move forward to skip the data item.

19. The non-transitory computer-readable storage medium of claim 14, wherein the executable instructions, as a result of being executed by the one or more processors, further cause the computer system to at least:
- receive a request to retrieve the data item;
- compute a hash value by hashing a key associated with the data item;
- use the hash value to identify a hash bucket associated with the key;
- traverse entries in the hash bucket and compare whether the hash value matches a hash value in the hash bucket;
- as a result of the comparison, determine whether the data item is in the log-based storage structure using the index entry; and
- submit, based at least in part on the determination, an asynchronous request to read the data item; and
- retrieve the data item based at least in part on matching the key associated with the data item provided in the request with a key in the log-based storage structure.

20. The non-transitory computer-readable storage medium of claim 14, wherein the executable instructions, as a result of being executed by the one or more processors, further cause the computer system to at least:
- receive a request to retrieve the data item;
- compute a hash value by hashing a key associated with the data item;
- use the hash value to identify a hash bucket associated with the key;
- traverse entries in the hash bucket and compare whether the hash value matches a hash value in the hash bucket;
- as a result of the comparison, determine whether the data item is in the in-memory data structure using the index entry;
- provide the data item based at least in part on matching the key associated with the data item provided in the request with a key from the index entry.

* * * * *